US008187005B1

(12) United States Patent
Ward (10) Patent No.: US 8,187,005 B1
(45) Date of Patent: May 29, 2012

(54) INTERACTIVE CHALKBOARD

(75) Inventor: Darrell L. Ward, Denton, TX (US)

(73) Assignee: eInstruction Corporation, Denton, TX (US)

( * ) Notice: Subject to any disclaimer, the term of this patent is extended or adjusted under 35 U.S.C. 154(b) by 853 days.

(21) Appl. No.: 11/939,056

(22) Filed: Nov. 13, 2007

(51) Int. Cl.
*G09B 25/00* (2006.01)
(52) U.S. Cl. ......... 434/365; 434/350; 434/362; 434/118
(58) Field of Classification Search .................. 434/350, 434/365, 362, 322
See application file for complete search history.

(56) References Cited

U.S. PATENT DOCUMENTS

| | | | | |
|---|---|---|---|---|
| 3,924,339 | A | 12/1975 | Wilson et al. ........................ | 35/8 |
| 4,178,698 | A | 12/1979 | Cornell ............................... | 35/8 |
| 5,508,713 | A | 4/1996 | Okouchi ............................ | 345/1 |
| 5,561,446 | A | 10/1996 | Montlick ........................ | 345/173 |
| 5,727,950 | A | 3/1998 | Cook et al. .................... | 434/350 |
| 5,769,643 | A | 6/1998 | Stevens, III .................... | 434/350 |
| 5,917,470 | A | 6/1999 | Fujioka .......................... | 345/127 |
| 6,549,751 | B1 | 4/2003 | Mandri ......................... | 434/350 |
| 6,628,918 | B2 | 9/2003 | Roschelle et al. .............. | 434/350 |
| 6,688,891 | B1 | 2/2004 | Sanford ......................... | 434/365 |
| 6,885,844 | B2 | 4/2005 | Roschelle et al. .............. | 434/350 |
| 6,963,334 | B1 | 11/2005 | Stevens et al. ................. | 345/179 |
| 7,083,420 | B2 | 8/2006 | Wood et al. .................... | 434/322 |
| 7,092,669 | B2 | 8/2006 | Sakai et al. .................... | 434/350 |
| 7,114,126 | B2 | 9/2006 | Berger et al. .................. | 715/750 |
| 7,129,934 | B2 | 10/2006 | Luman et al. .................. | 345/173 |
| 7,508,354 | B1 * | 3/2009 | Sanders et al. .................. | 345/1.1 |
| 2002/0056577 | A1 | 5/2002 | Kaye et al. .................... | 178/18.03 |
| 2003/0049594 | A1 | 3/2003 | Stuppy et al. .................. | 434/322 |
| 2003/0162152 | A1 | 8/2003 | Lee ................................ | 434/162 |
| 2003/0194688 | A1 | 10/2003 | Stuppy .......................... | 434/322 |
| 2003/0198936 | A1 | 10/2003 | Wen et al. ...................... | 434/351 |
| 2004/0072136 | A1 | 4/2004 | Roschelle et al. ............ | 434/350 |
| 2004/0201620 | A9 * | 10/2004 | Berque .......................... | 345/751 |
| 2005/0112540 | A1 | 5/2005 | Whaley ......................... | 434/365 |
| 2005/0219225 | A1 | 10/2005 | Dunn et al. .................... | 345/173 |
| 2006/0154227 | A1 | 7/2006 | Rossi et al. .................... | 434/350 |
| 2008/0114844 | A1 * | 5/2008 | Sanchez et al. ............... | 709/206 |

FOREIGN PATENT DOCUMENTS

| | | |
|---|---|---|
| JP | 2002 333820 | 11/2002 |
| KR | 20030000034 | 1/2003 |

OTHER PUBLICATIONS

Gerald Friedland, E-Chalk Technical description, Aug. 28,2001, Freie Universitat Berlin,1-27.*

* cited by examiner

*Primary Examiner* — Xuan M. Thai
*Assistant Examiner* — Banafsheh Hadizonooz
(74) *Attorney, Agent, or Firm* — Baker Botts L.L.P.

(57) ABSTRACT

Communicating in an educational environment includes placing a chalkboard in a private mode that allows a user of the chalkboard to view information exclusive of others in the educational environment. Information is displayed on the chalkboard according to the private mode. The chalkboard is placed in a public mode that allows the chalkboard to control a common display, and information is controlled on the common display using the chalkboard. The common display is viewable by others in the educational environment according to the public mode.

21 Claims, 5 Drawing Sheets

INTERACTIVE CHALKBOARD

TECHNICAL FIELD

This invention relates generally to communication in an education environment, and more specifically to an interactive chalkboard.

BACKGROUND

Incorporation of technology into the classroom has been an increasing trend in recent years. Communication systems allow teachers to provide more information to, and receive more feedback from, their students. However, the technological elements are not fully interactive. This incomplete interactivity reduces the overall efficiency of the education process.

SUMMARY OF THE DISCLOSURE

In accordance with the present invention, disadvantages and problems associated with previous techniques for communicating in an education environment may be reduced or eliminated.

According to one embodiment of the present invention, communicating in an educational environment includes placing a chalkboard in a private mode that allows a user of the chalkboard to view information exclusive of others in the educational environment. Information is displayed on the chalkboard according to the private mode. The chalkboard is placed in a public mode that allows the chalkboard to control a common display, and information is controlled on the common display using the chalkboard. The common display is viewable by others in the educational environment according to the public mode.

Certain embodiments of the invention may provide one or more technical advantages. A technical advantage of one embodiment includes a wireless device that provides information to a user and interacts with other elements in an education environment, such as a computer and a common display. Therefore, the user may remotely communicate with the computer, which provides flexibility and enhances communication in the education environment.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DESCRIPTION OF EXAMPLE EMBODIMENTS

Figure 1:
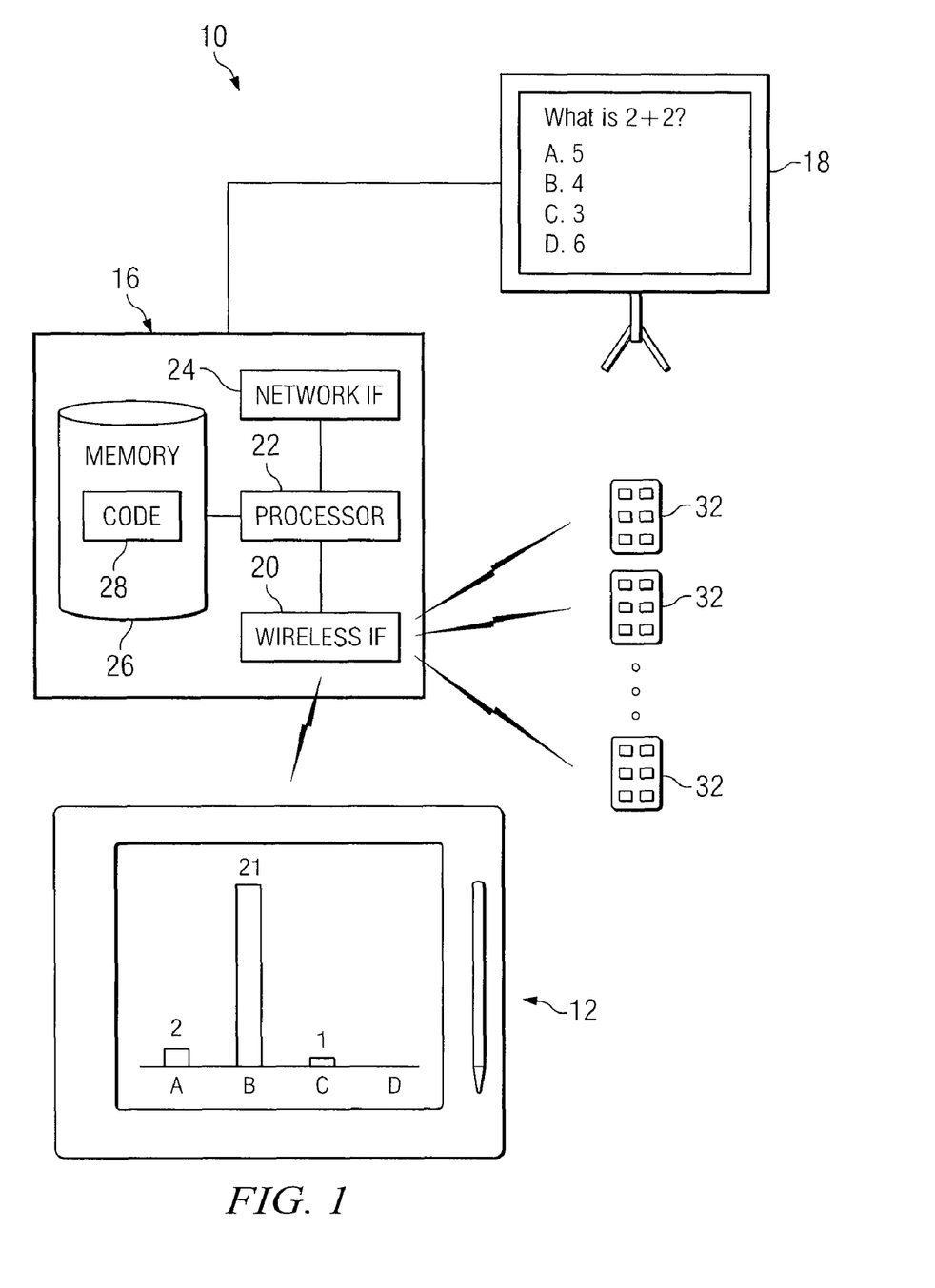
FIG. 1 illustrates a system for communicating in an education environment.

FIG. 1 illustrates an example system 10 for communicating in an education environment. System 10 includes an interactive chalkboard 12 that communicates with computer 16 to manipulate information on common display 18 or to receive information associated with the displayed information. Chalkboard 12 allows a user to remotely communicate in the education environment. An "education environment" may be a traditional classroom environment, a meeting, a focus group, or any other gathering in which an instructor or moderator interacts with a group using display 18.

Chalkboard 12 represents any suitable interactive wireless device that exchanges signals with computer 16 to communicate in system 10. Chalkboard 12 may include a wireless peripheral that communicates with computer 16. In the illustrated embodiment, chalkboard 12 includes an interface that provides information to a user and receives inputs from a user. Chalkboard 12 operates in different modes. For example, chalkboard 12 operates in a public mode, a private mode, and a public-private mode.

In the public mode, chalkboard 12 communicates information or directives with computer 16. All users in system 10 are able to view actions taken by the user of chalkboard 12 in public mode. For example, chalkboard 12 facilitates a remote mouse capability to control a pointer on display 18 or to control the movement of a cursor to execute a task or command. As another example, chalkboard 12 facilitates the annotation of information on display 18.

In the private mode, chalkboard 12 communicates information or directives with computer 16. In private mode, the user of chalkboard 12 views the information on chalkboard 12 exclusive of others in system 10. For example, chalkboard 12 sends answers to a question, parameters for a simulation, directives to computer 16 for activation of other applications, a command for execution of a task, or any other suitable information. As another example, chalkboard 12 may receive and display notes associated with information presented on display 18. As yet another example, chalkboard 12 may provide prompts or help associated with an application, lesson plans, or feedback based on data received in system 10. As another example, chalkboard 12 may receive and display data from an application, such as student responses as inputted on remote units 32, corrects answers to a question, graphs of question results, or any other suitable information.

Chalkboard 12 may also operate simultaneously in the private mode and the public mode. In this public-private mode, chalkboard 12 performs activities that include both aspects of the public mode and the private mode. For example, chalkboard 12 operates as a mouse input to computer 16 while exclusively displaying information to the user of chalkboard 12. As another example, chalkboard 12 may annotate information on display 18 while viewing different information on chalkboard 12.

Computer 16 represents any suitable device that communicates with chalkboard 12 and communicates information to display 18. Computer 16 drives the operation of system 10 and the components within system 10, such as chalkboard 12, display 18, and remote units 32. To facilitate the communication and display of information, computer 16 executes applications, such as a word processing application, a presentation application, a training program, a web browser, an educational application, a web-based application, or any other suitable application. In the illustrated embodiment, computer 16 includes a wireless interface 20, processor 22, network interface 24, and memory 26. Computer 16 includes any suitable type of device that manipulates data according to instructions, such as a personal computer, a laptop, a desktop, or any other suitable type of computer.

Wireless interface 20 represents any suitable element that communicates wireless signals. For example, wireless interface 20 may include an antenna, sensor, emitter, receiver, transmitter, or other suitable component to communicate a wireless signal. Wireless interface 20 represents any port or connection, real or virtual, including any suitable hardware and/or software that allows chalkboard 12 to communicate wireless signals. Wireless signals may include any suitable wireless signal, such as a radio frequency signal (e.g., 802.11 or WiFi signal), an infrared signal, or any other suitable wireless signal.

Processor 22 processes information to exchange with chalkboard 12 and remote units 32 and transmits information to display 18. Processor 22 may also manage components in system 10. For example, processor 22 runs an application that manages the information communicated to display 18. Processor 22 includes any hardware, software, or both that operate to control and process information in system 10. For example, processor 22 may be a programmable logic device, a microcontroller, a microprocessor, any suitable processing device, or any combination of the preceding. In a particular embodiment, processor 22 is the central processing unit of a personal computer. In another embodiment, processor 22 is distributed among components of system 10.

Network interface 24 represents any suitable element that communicates information between computer 16 and a public or private network. Network interface 24 may include any port or connection, real or virtual, wireline or wireless, including any suitable hardware, software, or a combination of the preceding.

Memory 26 stores, either permanently or temporarily, data, code 28, or other information for processing by processor 22. Memory 26 includes any one or a combination of volatile or nonvolatile local or remote devices suitable for storing information. For example, memory 26 may include magnetic media, optical media, CD-ROMs, DVD-ROMs, removable media, any other suitable information storage device, or any suitable combination of these devices. Memory 26 stores code 28.

Code 28 represents a set of instructions that processor 24 executes to control the operation of computer 16. Code 28 includes operating system code, applications, user files, logic modules, or any other executable software or data files.

Display 18 represents any suitable component that displays information to the user of chalkboard 12 and to remote units 32. Display 18 may include a monitor, a projection screen, a television screen, or any other suitable device that visually displays information. Display 18 may be a single display simultaneously visible to the user of chalkboard 12 and remote units 32. Display 18 may display a variety of information. For example, display 18 may display questions for remote units 32 to answer, a presentation, or any other suitable information. In the illustrated embodiment, display 18 displays the information communicated from computer 16 to provide simultaneous viewing by remote units 32 and chalkboard 12.

Remote units 32 represent any suitable device for sending information to computer 16. Remote units 32 may send the information in response to an executed application. One of several buttons is pushed on remote unit 32 to communicate a wireless signal to computer 16. Remote unit 32 may communicate using any suitable type of wireless signal, such as a radio frequency signal or an infrared signal. In a particular embodiment, remote unit 32 has limited or no display capability. Depending on the mode of chalkboard 12, a response on remote unit 32 may affect the information presented on chalkboard 12.

In operation, chalkboard 12 communicates information with computer 16. A user of chalkboard 12 places chalkboard 12 in a mode of operation. In the illustrated embodiment, chalkboard 12 operates in a public mode, a private mode, and a public-private mode. The user communicates with computer 16 in the designated mode using chalkboard 12. For example, if chalkboard 12 is in the public mode, the user controls the movement of a cursor or pointer on display 18 using chalkboard 12. As another example, if chalkboard 12 is in the private mode, the user may receive notes from memory 26 associated with information on display 18. As yet another example, if chalkboard 12 is in the private mode, computer 16 receives student responses to a question displayed on display 18 from remote units 32 and communicates the responses to chalkboard 12.

In the illustrated embodiment, display 18 presents a question for remote units 32 to answer. Chalkboard 12 is in the private mode and is configured to display the results of responses received from remote units 32. Each remote unit 32 communicates a response to the displayed question to computer 16 for processing and manipulation. Computer 16 communicates the responses to chalkboard 12 for display. In the illustrated embodiment, two remote units 32 communicated "A", twenty-one remote units 32 communicated "B", one remote unit 32 communicated "C", and zero remote units 32 communicated "D".

Modifications, additions, or omissions may be made to system 10. For example, system 10 may include any suitable number of remote units 32. As another example, computer 16 may include a display in addition to common display 18. As yet another example, system 10 may include more than one chalkboard 12. Moreover, the operations of system 10 may be performed by more, fewer, or other components. Any suitable logic comprising software, hardware, other logic, or any suitable combination of the preceding may perform the functions of system 10.

Figure 2:
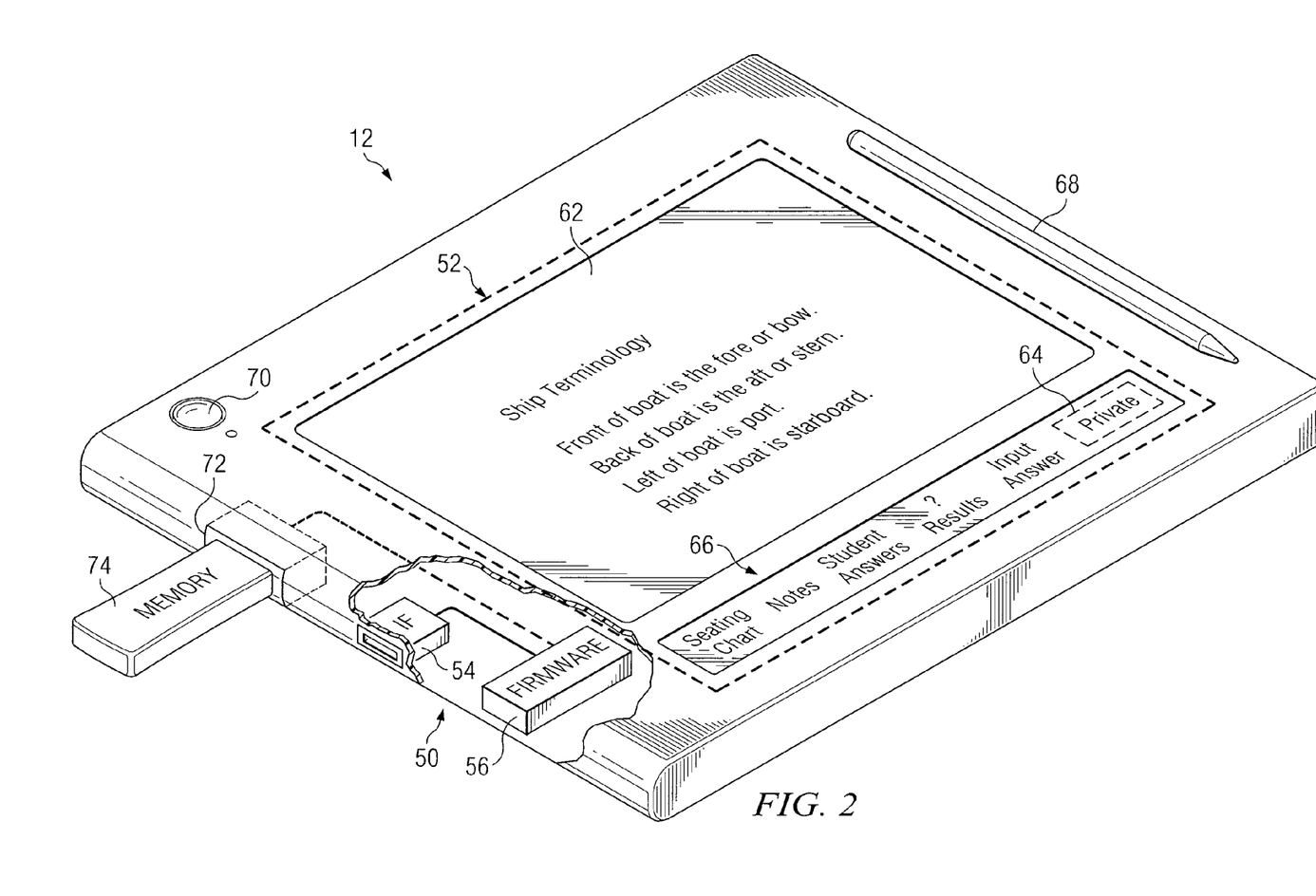
FIG. 2 is a detailed illustration of an embodiment of an interactive chalkboard that communicates in the system.

FIG. 2 is a detailed illustration of an embodiment of interactive chalkboard 12 that communicates in system 10. Chalkboard 12 includes control components 50 and user components 52. Control components 50 facilitate the operation of chalkboard 12, and user components 52 allow a user to interact with chalkboard 12.

Control components 52 include a wireless interface and firmware 56. Wireless interface 54 allows chalkboard 12 to exchange wireless signals with computer 16. For example, wireless interface 54 may include an antenna, sensor, emitter, receiver, transmitter, or other suitable component to communicate a wireless signal. For example, wireless interface 54 receives wireless signals from computer 16 regarding information on display 18. As another example, wireless interface 54 sends wireless signals to computer 16 to control a cursor on display 18. Wireless interface 54 represents any port or connection, real or virtual, including any suitable hardware and/or software that allows chalkboard 12 to exchange information with computer 16 or other elements of system 10.

Firmware 56 processes information received from wireless interface 54 and information from removable memory 74. Firmware 56 includes any hardware, software, or both that operate to process information. For example, firmware 56 may be a microcontroller, a microprocessor, any suitable processing device, or any suitable combination of the preceding.

User components 52 include a graphical user interface (GUI) 62, a mode indicator 64, a command line 66, and a stylus 68. GUI 62 represents any suitable component that displays and receives information on the same screen. GUI 62 may include a liquid crystal display having a touch screen or any other suitable device that visually displays information and receives inputs.

Depending on the mode of chalkboard 12, GUI 62 may present different information. For example, in the public mode, GUI 62 may not present any information and the user views display 18. Alternatively, GUI 62 may display information from display 18, or GUI 62 may display information to be displayed on display 18. In the public mode, GUI 62 may receive inputs from a user to control a cursor on display 18 or may receive an input from a user to present information on display 18. In the private mode, for example, GUI 62 may display information related to information presented on display 18, such as notes, answers, or responses to questions. In the illustrated embodiment, GUI 62 displays notes associated with information presented on display 18. For example, display 18 presents a question regarding ship terminology. GUI 62 provides notes about ship terminology. GUI 62 may present information in any suitable format. For example, GUI 62 presents information in a graphical format or a list format. In an embodiment, a user may change the format in which GUI 62 presents information.

Mode indicator 64 represents any suitable component that indicates the mode of chalkboard 12 and receives an input from a user to change the mode of chalkboard 12. Mode indicator 64 may include a touch screen, a programmable soft key, fixed command keys, or any other suitable component that indicates the mode and allows a user to toggle between modes. A user may press mode indicator 64 to change the current mode of chalkboard 12. As previously mentioned, chalkboard 12 may operate in a public mode, a private mode, and a public-private mode. The modes of operation depend on the application executed by computer 16 or the activity performed in system 10. In the illustrated embodiment, mode indicator 64 indicates that chalkboard 12 is in the private mode, and command line 66 includes mode indicator 64.

Command line 66 represents any suitable component that displays commands to the user of chalkboard 12 and receives an input from the user. Command line 66 may include a touch screen, programmable soft keys, fixed command keys, or any suitable component that allows a user to change GUI 62 according to the input. Command line 66 may change depending on the mode of chalkboard 12 and the current application or activity. In an embodiment, command line 66 includes any suitable command that facilitates the communication between chalkboard 12 and computer 16. In another embodiment, command line 66 receives inputs from a user to display on display 18, such as an answer to a question.

Command line 66 includes commands associated with the mode of chalkboard 12. The commands associated with the mode may depend on the application executed by computer 16 or the activity performed in system 10. For example, if chalkboard 12 is in the private mode, command line 66 may include the following commands that associate with the private mode: seating chart, notes, student answers, question results, and input answer. A user may change the commands command line 66 presents. In the illustrated embodiment, chalkboard 12 is in the private mode and command line 66 includes an example of commands associated with the private mode. As another example, command line 66 may include commands that associate with the public mode.

Stylus 68 represents any suitable writing utensil that does not have ink. Stylus 68 allows a user to input information on chalkboard 12. A user may use stylus 68 to input information into GUI 62, mode indicator 64, or command line 66. As another example, stylus 68 may be a laser pointer that allows a user to highlight information on display 18. Stylus 68 may dock onto chalkboard 12 using any suitable fastening mechanism, such as tape, an indentation that holds stylus 68, or a hook-and-loop fastener.

Chalkboard 12 also includes a power button 70 and an input port 72. Power button 70 includes any suitable component that powers on and powers off chalkboard 12. Power button 70 may include a button, a switch, a toggle, or any other suitable component that places chalkboard 12 in on and off states according to the position of the component. Input port 72 represents any suitable component that receives external information, such as a serial port, parallel port, a Universal Serial Bus (USB) port, or other suitable port or interface. In the illustrated embodiment, input port 72 receives a removable memory 74. Removable memory 74 represents a removable, external storage device that stores information, such as a flash memory. Chalkboard 12 may use the information on removable memory 74 during communication with computer 16. For example, chalkboard 12 may retrieve information from removable memory 74 and send the information to computer 16 to display on display 18. As another example, chalkboard 12 may retrieve information from removable memory 74 for display on GUI 62 of chalkboard 12.

Modifications, additions, or omissions may be made to chalkboard 12. For example, chalkboard 12 may include any suitable number of user components 52 to facilitate interaction between the user and chalkboard 12. As another example, GUI 62 may include command line 66 and/or mode indicator 64. As yet another example, command line 66 may include mode indicator 64. As another example, chalkboard 12 may include a direct current (DC) input to allow chalkboard 12 to be plugged into an outlet to charge chalkboard 12 and/or stylus 68. Additionally, any suitable logic comprising software, hardware, other logic, or any suitable combination of the preceding may perform the functions of endpoint 12.

Figure 3A:
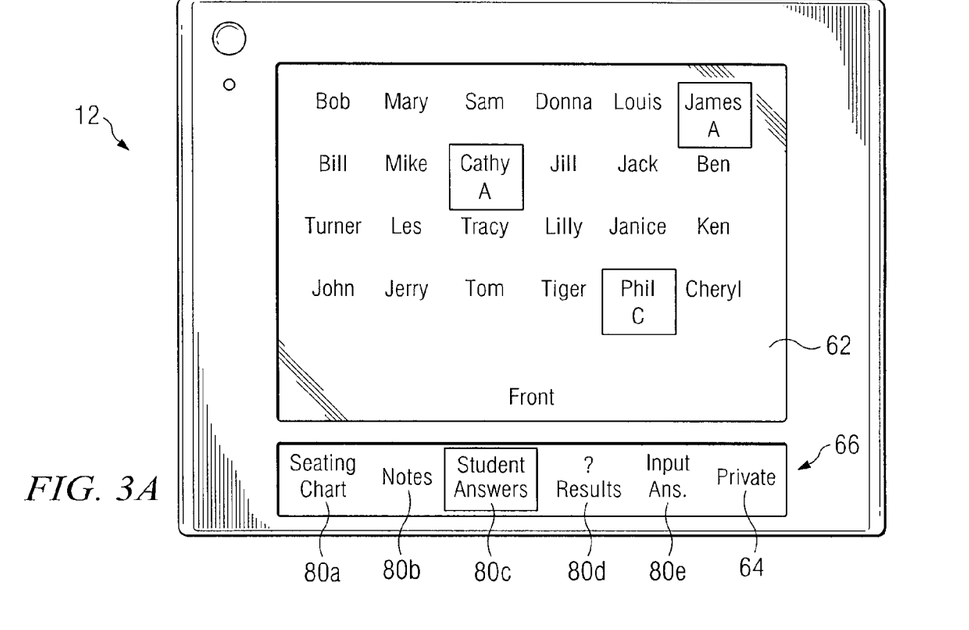
FIGS. 3A-3B illustrate examples of the interactive chalkboard in a private mode.
Figure 3B:
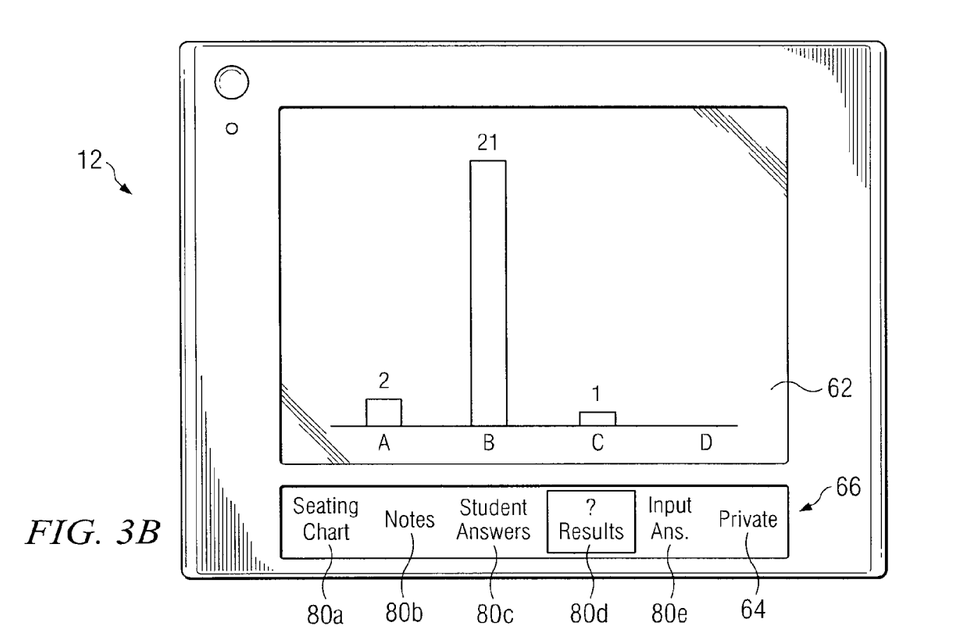

FIGS. 3A-3B illustrate examples of interactive chalkboard 12 in a private mode. Mode indicator 64 indicates that chalkboard 12 is in the private mode. In this mode, a user of chalkboard 12 may view information without other users in system 10 viewing the information. A user of chalkboard 12 selects a private command 80 on command line 66. Chalkboard 12 presents information associated with the selected command 80 on GUI 62.

Chalkboard 12 in FIGS. 3A-3B include the following private commands 80: seating chart command 80*a*, notes command 80*b*, student answers command 80*c*, question results command 80*d*, and input answer command 80*e*. When initiated, seating chart command 80*a* displays a seating chart in GUI 62. Using seating chart command 80*a*, a user may select a student on the seating chart to receive additional, specific information about the student. Notes command 80*b* displays notes associated with the information presented on display 18. For example, notes command 80*b* may display notes associated with a presentation on display 18. Student answers command 80*c* displays the seating chart and the response each remote unit 32 communicates. Question results command 80*d* displays the results to a question. The results may be displayed in any suitable format, such as in a bar graph, a pie graph, or a line graph. Input answer command 80*e* provides characters, such as numbers, letters, or symbols, for a user of chalkboard 12 to input an answer to a question. For example, if an instructor asks an ad-hoc question during a class session, the teacher may input the answer to the question on command line 66. As discussed above, chalkboard 12 may include any suitable number and type of private commands 80. Commands 80 may be combined as appropriate.

In operation, the student answers command 80c is selected in FIG. 3A. Chalkboard 12 presents information on GUI 62 associated with the highlighted command 80. For example, GUI 62 displays responses received from remote units 32. When a different command is highlighted on command line 66, GUI 62 changes. In FIG. 3B, the question results command 80d is selected. Because a new command 80 is selected, chalkboard 12 presents information associated with the new command 80. Chalkboard 12 presents the results of a question in a bar graph on GUI 62.

Modifications, additions, or omissions may be made to chalkboard 12 in the private mode. For example, chalkboard 12 may include any suitable number and type of private commands 80.

Figure 4:
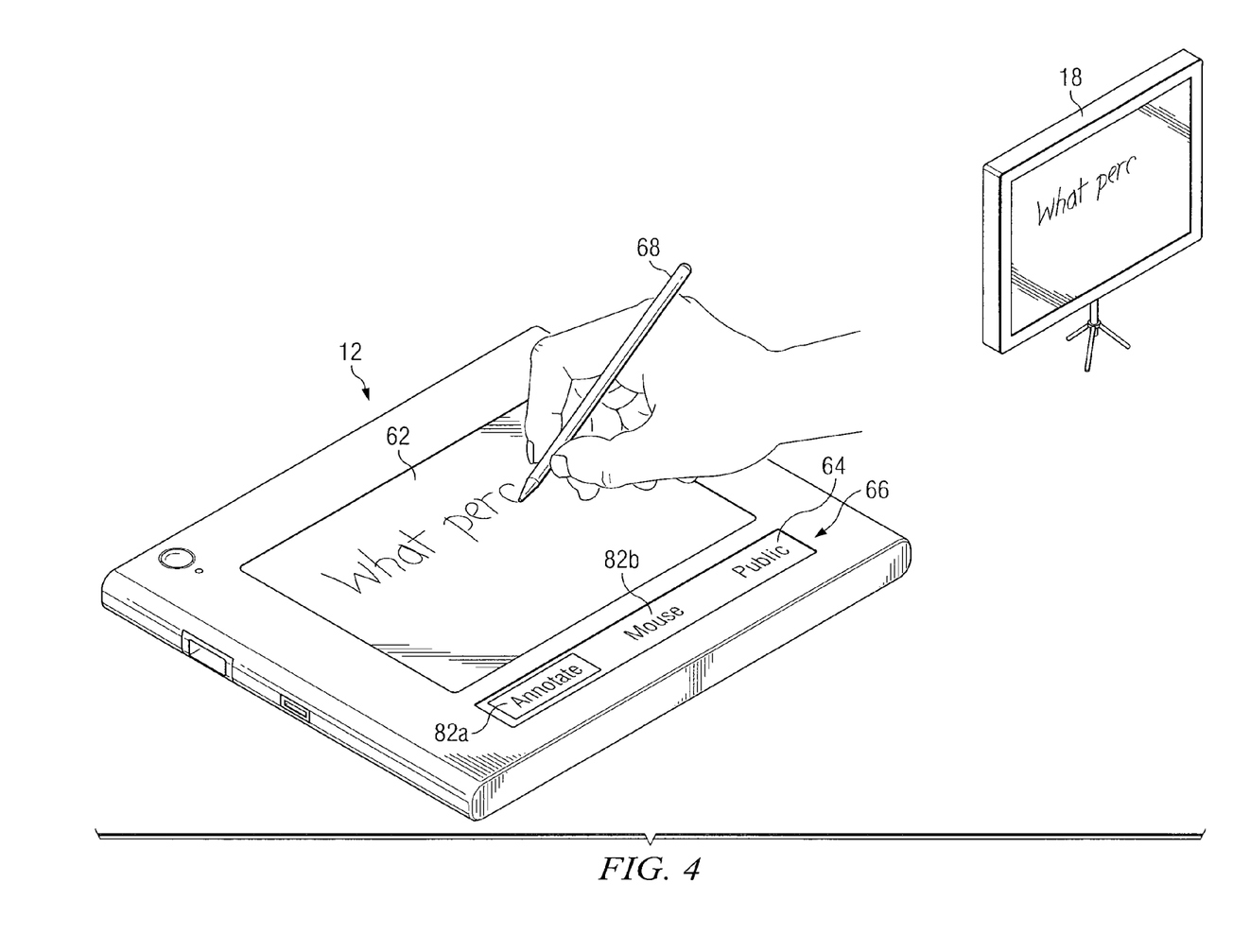
FIG. 4 illustrates an example of the interactive chalkboard in a public mode.

FIG. 4 illustrates an example of interactive chalkboard 12 in a public mode. Mode indicator 64 indicates that chalkboard 12 is in the public mode. In this mode, all users in system 10, in addition to the user of chalkboard 12, may view information inputted on chalkboard 12.

In the illustrated embodiment, command line 66 includes two public commands 82, annotate command 82a and mouse command 82b. Annotate command 82a allows a user to annotate information presented on display 18 using chalkboard 12 and stylus 68. Mouse command 82b allows a user to remotely control a cursor or pointer on display 18 using stylus 68 or GUI 62. The user of chalkboard 12 selects a command 82 on command line 66. Because annotate command 82a is selected, a user may make annotations that appear on display 18. For example, as a user writes on GUI 62, the information appears on display 18. As another example, if computer 16 is running an application that displays information on display 18, chalkboard 12 may annotate the displayed information.

Modifications, additions, or omissions may be made to chalkboard 12 in the public mode. For example, chalkboard 12 may not include any associated commands 82. In this example, placing chalkboard 12 in the public mode is enough to initiate annotation and mouse capabilities.

Figure 5:
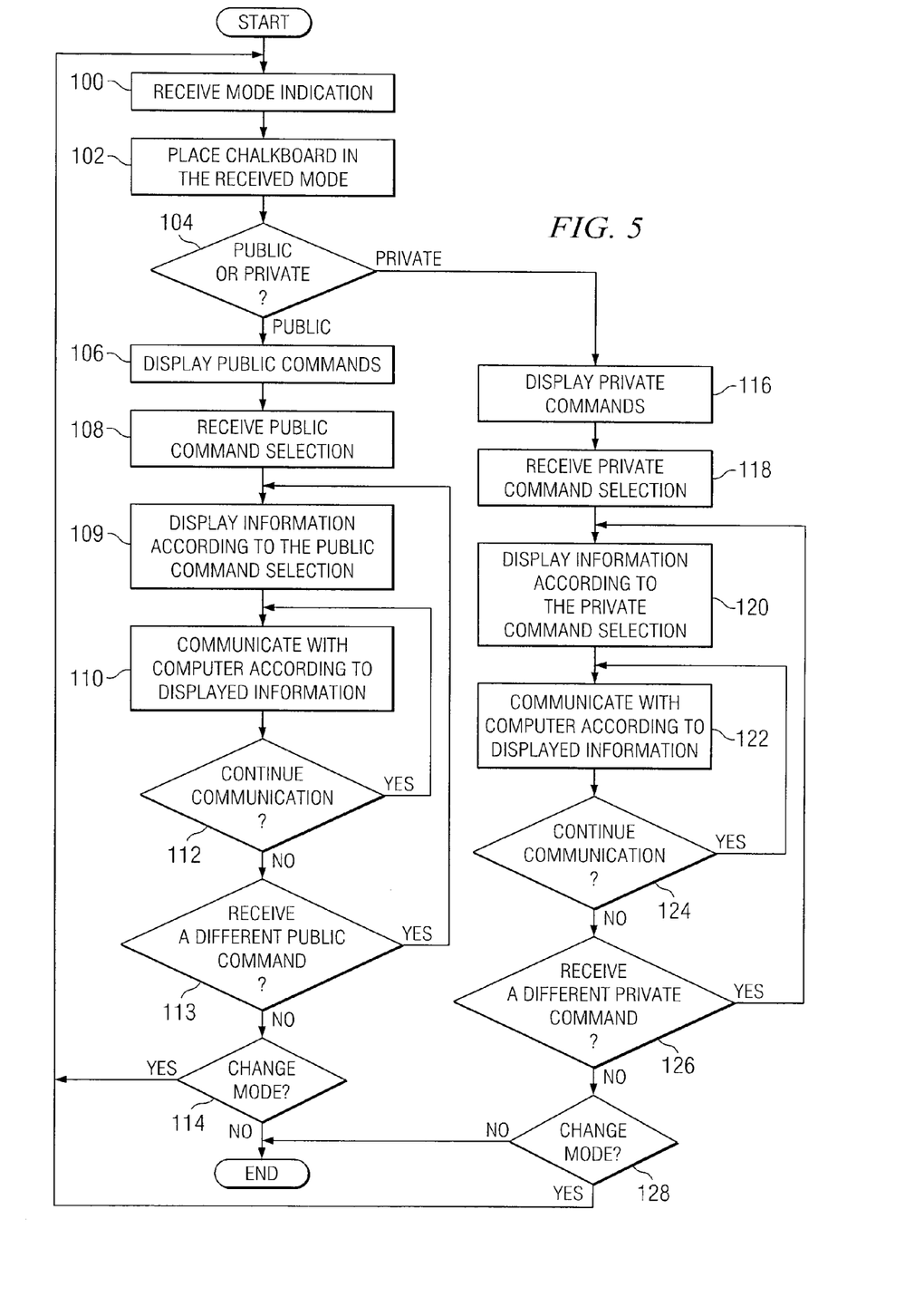
FIG. 5 is a flowchart illustrating a method for communicating in an education environment using the interactive chalkboard.

FIG. 5 is a flowchart illustrating a method for communicating in an education environment using interactive chalkboard 12. At step 100, chalkboard 12 receives a mode indication. The mode indication depends on the application executed by computer 16 or the activity performed in system 10. Chalkboard 12 is placed in the received mode at step 102. For example, if chalkboard 12 receives a private mode indication, chalkboard 12 is placed in the private mode. At step 104, chalkboard 12 determines whether it is in the public mode or private mode.

If in the public mode, at step 106, chalkboard 12 displays public commands 82 on command line 66. As discussed above, chalkboard 12 may display any suitable number of public commands 82. Chalkboard 12 receives a public command 82 selection at step 108. Chalkboard 12 displays information at step 109. The displayed information is based on the received selection. Based on the selection, chalkboard 12 communicates with computer 16 at step 110.

At step 112, chalkboard 12 determines whether communication continues with computer 16 and continues communication by returning to step 110. If communication ends, chalkboard 12 determines whether a different public command 82 is received at step 113. Chalkboard 12 continues from step 109 to display information according to the new public command 82 selection. If a new public command 82 selection is not received, chalkboard 12 determines at step 114 whether the mode changes. If the mode changes, the method continues from step 100 and chalkboard 12 receives the mode indication. Otherwise, the method ends.

If in the private mode, chalkboard 12 displays private commands 80 on command line 66 at step 116. As discussed above, chalkboard 12 may display any suitable number of private commands 80. Chalkboard 12 receives a private command 80 selection at step 118. Chalkboard 12 displays information at step 120. The displayed information is based on the received selection. At step 122, chalkboard 12 communicates with computer 16 according to the displayed information.

At step 124, chalkboard 12 determines whether communication continues with computer 16 and returns to step 122 if the communication continues. If communication ends, chalkboard 12 determines whether a different private command 80 is received at step 126. Chalkboard 12 continues from step 120 to display information according to the new private command 80 selection. If a new private command 80 selection is not received, chalkboard 12 determines at step 128 whether the mode changes. If the mode changes, the method continues from step 100 and chalkboard 12 receives the mode indication. Otherwise, the method ends.

Modifications, additions, and omissions may be made to FIG. 5. For example, if the public mode has one associated command, chalkboard 12 may not display public commands 80 on command line 66. Although described in a particular sequence, the steps in the flowchart may occur serially or in parallel in any suitable order.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for communicating in an educational environment, comprising:
    placing a chalkboard in a private mode that allows a user of the chalkboard to view information exclusive of participants in the educational environment;
    displaying one or more commands associated with the private mode on a command line of the chalkboard;
    displaying information on the chalkboard according to the private mode;
    placing the chalkboard in a public mode that allows the chalkboard to control a single common physical display simultaneously viewable by participants in the educational environment;
    removing the one or more commands associated with the private mode from the command line of the chalkboard in response to placing the chalkboard in public mode;
    displaying one or more commands associated with the public mode on the command line of the chalkboard; and
    controlling information on the single common physical display using the chalkboard for view by participants in the educational environment.

2. The method of claim 1, further comprising:
    in the private mode, receiving information from a computer to display to the user of the chalkboard; and
    in the public mode, transmitting control information to the computer to control information on the single common physical display.

3. The method of claim 1, further comprising:
    receiving a private mode command selection of the one or more displayed commands while the chalkboard is in private mode;
    receiving information from a computer according to the private mode command selection; and displaying information on a graphical user interface associated with the private command selection.

4. The method of claim 1, further comprising:
receiving a public mode command selection of the one or more displayed commands while the chalkboard is in public mode; and
transmitting control information to a computer according to the public mode command selection.

5. The method of claim 1, further comprising displaying information on a graphical user interface as shown on the single common physical display while in the public mode.

6. The method of claim 1, wherein the chalkboard is in the private mode and the public mode simultaneously, further comprising transmitting control information to a computer to control information on the single common physical display.

7. The method of claim 1, further comprising receiving information from a computer to display on the chalkboard, the information responsive to an application executing on the computer.

8. The method of claim 1, further comprising accessing a removable memory to receive information.

9. A system for communicating in an educational environment, comprising:
a computer operable to facilitate communication in the educational environment;
a single common physical display simultaneously viewable by participants in the educational environment and operable to visually indicate information received from the computer; and
a chalkboard operable to communicate with the computer in a private mode that allows a user of the chalkboard to view information exclusive of participants in the educational environment and in a public mode that allows the user of the chalkboard to control information on the single common physical display simultaneously viewable by participants in the educational environment, the chalkboard comprising a command line operable to display commands associated with the private mode when the chalkboard is in private mode and operable to display commands associated with the public mode when the chalkboard is in public mode, the chalkboard operable to change the commands displayed by the command line in response to placing the chalkboard in public mode or private mode.

10. The system of claim 9, further comprising a remote unit operable to send a response to the computer, wherein the response affects information viewable on the chalkboard.

11. The system of claim 9, wherein the computer is further operable to execute an application and facilitate the communication in the educational environment according to the executed application.

12. The system of claim 9, wherein the chalkboard is in the private mode and the public mode simultaneously, the chalkboard further operable to transmit control information to the computer to control information on the single common physical display.

13. A chalkboard, comprising:
firmware operable to:
place the chalkboard in a private mode that allows a user of the chalkboard to view information exclusive of participants in an educational environment;
place the chalkboard in a public mode that allows the chalkboard to control a single common physical display simultaneously viewable by participants in the educational environment; and
control information on the single common physical display using the chalkboard; and a graphical user interface comprising a command line, the command line operable to:
display commands associated with the public mode when the chalkboard is in public mode; and
display commands associated with the private mode when the chalkboard is in private mode.

14. The chalkboard of claim 13, further comprising a wireless interface coupled to the firmware, the wireless interface operable to:
in the private mode, receive information from a computer to display to the user of the chalkboard; and
in the public mode, transmit control information to the computer to control information on the single common physical display.

15. The chalkboard of claim 13,
the graphical user interface further operable to receive a public mode command selection of the one or more displayed commands while the chalkboard is in public mode; and
further comprising a wireless interface operable to transmit control information to a computer according to the public mode command selection.

16. The chalkboard of claim 13, the graphical user interface further operable to display information as shown on the single common physical display while in the public mode.

17. The chalkboard of claim 13,
the command line further operable to receive a private mode command selection of the one or more displayed commands while the chalkboard is in private mode;
further comprising a wireless interface operable to receive information from a computer according to the private mode command selection; and
the graphical user interface further operable to display information associated with the private command selection.

18. The chalkboard of claim 13, the firmware further operable to, in the private mode and the public mode simultaneously, transmit control information to a computer to control information on the single common physical display.

19. The chalkboard of claim 13, further comprising a wireless interface operable to receive information from a computer to display on the graphical user interface, the information responsive to an application executing on the computer.

20. The chalkboard of claim 13, further comprising a removable memory to store information, the firmware further operable to access the removable memory to receive information.

21. A method for communicating in an educational environment, comprising:
placing a chalkboard in a private mode that allows a user of the chalkboard to view information exclusive of participants in the educational environment;
displaying one or more commands associated with the private mode on a command line of the chalkboard;
receiving a private mode command selection of the one or more displayed commands;
receiving information from a computer according to the private mode command selection to display to the user of the chalkboard;
displaying information on a graphical user interface of the chalkboard associated with the private command selection;
placing the chalkboard in a public mode that allows the chalkboard to control a single common physical display simultaneously viewable by participants in the educational environment;

controlling information on the single common physical display using the chalkboard;

removing from the command line the one or more commands associated with the private mode in response to placing the chalkboard in public mode;

displaying one or more commands associated with the public mode on the command line of the chalkboard;

receiving a public mode command selection of the one or more displayed commands;

in the public mode, transmitting control information to the computer to control information on the single common physical display according to the public mode command selection; and displaying information on the graphical user interface as shown on the single common physical display while in the public mode.

* * * * *